BLOOD, HATHAWAY & BEACH.
Wheel Cultivator.
No. 3,945. Reissued May 3, 1870.
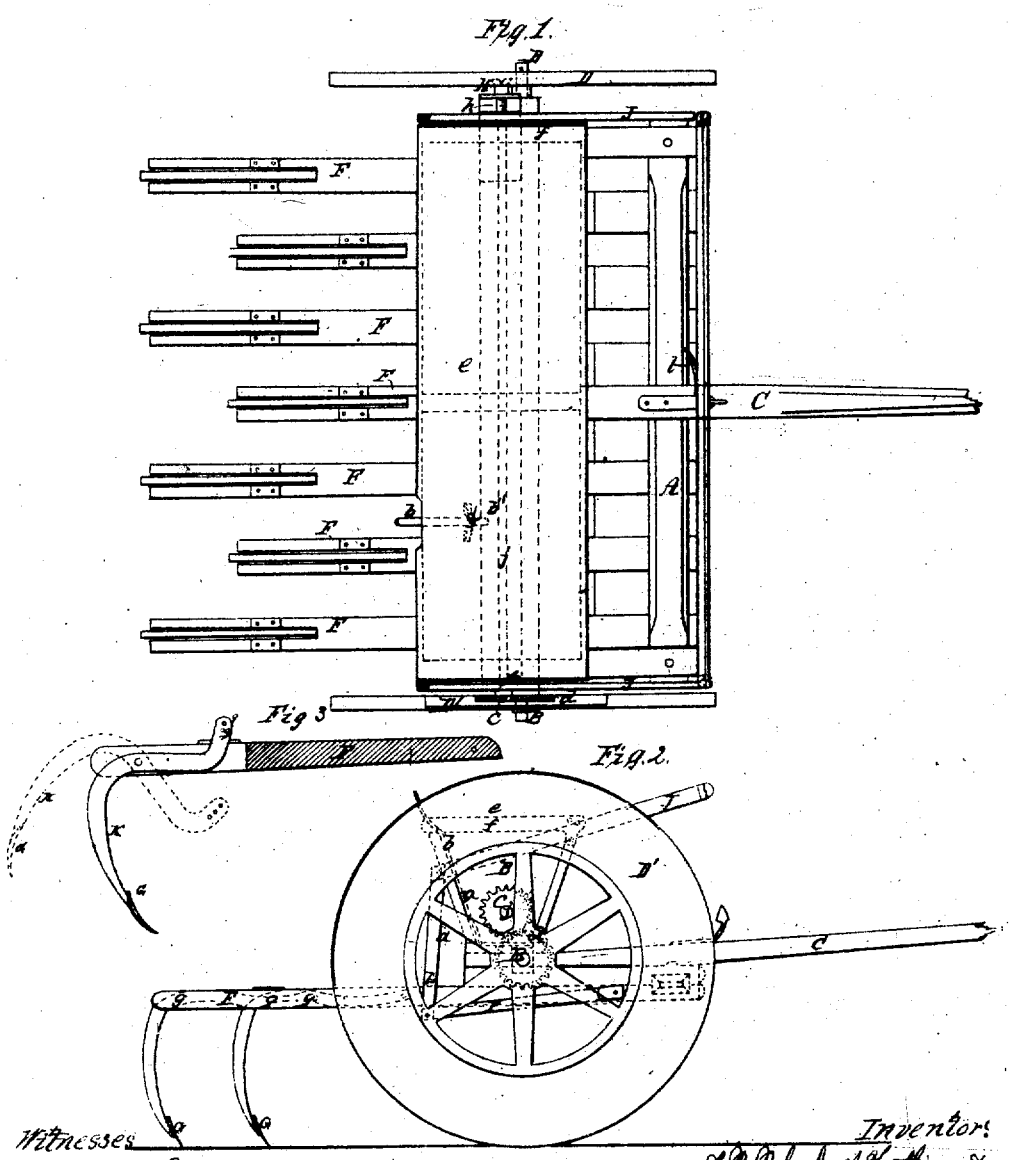
Witnesses
J. A. Bery
J. A. White.
Inventors:
A. S. Blood, J. H. Hathaway & H. C. Beach
per J. H. Alexander
Atty

United States Patent Office.

A. R. BLOOD, ALEXANDER HATHAWAY, AND V. R. BEACH, OF INDEPENDENCE, IOWA.

*Letters Patent No.* 79,304, *dated June* 30, 1868; *reissue No.* 3,945, *dated May* 3, 1870.

IMPROVEMENT IN CULTIVATORS.

The Schedule referred to in these Letters Patent and making part of the same

*To all whom it may concern:*

Be it known that we, A. R. BLOOD, ALEXANDER HATHAWAY, and V. R. BEACH, of Independence, in the county of Buchanan and State of Iowa, have invented certain new and useful Improvements in Cultivators; and we do hereby declare that the following is a full, clear, and exact description thereof, reference being had to the accompanying drawings and to the letters of reference marked thereon.

The nature of our invention consists—

First, in constructing the arms or shanks of the cultivator-teeth with adjusting holes.

Second, in the employment of levers, connected by a cross-bar, for elevating the teeth.

Third, supplying the seed-slide with a set-screw for gauging the amount of seed to be sown.

Fourth, providing the cultivator with a pivoted frame directly beneath the cultivator-bars, to which frame the levers are attached; and, Finally, in the employment of a rod or bar, acting as a lever, for depressing the teeth in the ground, and attached to the pivoted frame, substantially in the manner hereinafter set forth.

In order to enable others skilled in the art to which our invention appertains to make and use the same, we will now proceed to describe its construction and operation, referring to the annexed drawings, which form a part of this specification, and in which—

Figure 1 is a plan or top view of our machine;

Figure 2 is a side elevation of the same; and

Figure 3 is an enlarged view of a cultivator-bar, with shank and tooth.

A represents the frame of the machine, upon which is secured the axle B.

Secured to the axle, and resting upon the front end of the frame, is the tongue C.

D D′ represent the wheels, which are placed on the axle B.

The wheel D′ is provided on its inner side with a pinion, *d*, which is soldered or otherwise secured thereto, and will be referred to further hereafter.

E designates the seed-box, which is situated upon and secured to the axle B, and furnished in its bottom with square holes for the exit of the seed.

*b* represents a lever, having its fulcrum at *x*, and secured at its lower end to the perforated seed-slide *b′*, shown in dotted lines in fig. 1.

*e* is the lid or cover of the seed-box, which is hinged or secured thereto by means of metal strips *f f*, represented in dotted lines in fig. 2.

Secured and working in the lower part of the seed-box E is the rod *j*, to the outer end of which is fastened a pinion, *c*, which gears into the pinion *d* formed on the inside of wheel D′.

F F represent the cultivator-bars, which are secured in place at their front ends to the under side of the front part of the frame A by means of a metal rod, which passes through them, and is secured in the sides of said frame.

Every other one of the bars F F is made to project out a suitable distance beyond the other, and provided with slots, in order to receive the shanks K K of the cultivator-teeth G G.

The shanks K K are of the peculiar shape shown in fig. 3, curved slightly backward from the teeth G upward, then bent forward, and then upward.

The shank is pivoted in the slot on the bar F, just in front of the point where the shank turns forward, and it is held by a wooden pin inserted in one of a series of holes, *g*, in the upper end of the shank, the ends of which pin rest on the bar F.

By changing said pin in either of the holes *g g*, the teeth G G may be adjusted to any desired depth in the ground.

It will readily be seen that if the cultivator-tooth G should strike a stump or other obstruction, there is no danger of the tooth or shank breaking, because the wooden pin, resting on the bar F, and holding the shank, will break off and allow the shank to turn on its pivot, so as to clear the obstruction. Another pin is then easily put in.

I designates a frame, pivoted at its inner ends to the lower side of frame A, and provided at its outer ends with a bar, which rests against the under side of the cultivator-bars F F.

Resting on the bars F F, and attached to the bar of the pivoted frame I, is a bar or rod, L, which acts as a lever in depressing or sinking the teeth in the ground, when operated as will be stated hereafter.

J J designate two levers, one of which is pivoted to each side of the seed-box near its lower end, and fastened together at their front ends by means of a brace, which is held in place by metal braces or loops passing around the ends of the levers.

The lower or rear ends of the levers are slotted, so as to receive one end of the strips *a a*, the opposite end of said levers being secured to the bar of the pivoted frame I.

H designates a set-screw, which screws in a small metal plate, *h*, fastened to the bottom of the seed-box, and bent at right angles with it, so as to make it parallel with the seed-box, and thus allow the screw H to be screwed against or from the seed-slide, as the case may require.

The object of this arrangement is to gauge the quantity of seed to be sown by forcing or operating the screw against the slide, thus making smaller or lessening the size of the holes in the slide.

Z is a catch, by means of which the levers J J are held down in place when the machine is not in motion, said catch engaging with another catch on the tongue of the machine.

The operation of our machine is as follows:

The driver being in position, will start the horses, drawing the machine over the ground to be furrowed in order to receive the grain at the same instant, and, pressing the levers J J upward, lowering the teeth, and causing the bar L to depress or sink the teeth into the earth. At the same time pinion *d*, on wheel D′, will be operated, communicating motion to pinion *c*, and causing rod *j* to be revolved, which will loosen the seed in the seed-box, and allow them to escape through the holes in the bottom of the box, the seed-slide being gauged, according to the size of holes required, by means of the set-screw H, thus furnishing a simple and perfect means for cultivating the ground.

Having thus fully described our invention,

What we claim as new, and desire to secure by Letters Patent, is—

1. The levers J J, strips *a a*, bar L, and pivoted frame I, when all are arranged and operating substantially in the manner and for the purposes set forth.

2. The set-screw H, seed-slide *b*′, levers J J, strips *a a*, bar L, and pivoted frame I, all combined and arranged as and for the purpose described.

3. The arrangement within the slotted bar F of the shank K, provided with tooth G, when constructed as described, and the upper end of the shank, provided with two or more holes *g g*, and held by a wooden pin passing through either of said holes, and both ends of said pin resting upon the top of the bar F, substantially as and for the purposes herein set forth.

4. The combination and arrangement of the frame A, seed-box E, with rod *j*, and mechanism for operating the same, seed-slide *b*′, set-screw H, levers J J, strips *a a*, bar L, frame I, cultivator-bars F F, shanks K K, and teeth G G, all constructed as described, and operating substantially in the manner and for the purposes herein set forth.

In testimony that we claim the foregoing, we have hereunto set our hands this 30th day of September, 1869.

A. R. BLOOD.
ALEX. HATHAWAY.
V. R. BEACH.

Witnesses:
J. F. LYMAN,
J. L. MIDWARD.